(12) United States Patent
Wang et al.

(10) Patent No.: US 7,718,954 B2
(45) Date of Patent: May 18, 2010

(54) COMPONENT METHOD AND SYSTEM FOR PET DETECTOR EFFICIENCY NORMALIZATION

(75) Inventors: Wenli Wang, Aurora, OH (US); Thomas Laurence, North Royalton, OH (US); Zhiqiang Hu, Twinsburg, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 472 days.

(21) Appl. No.: 11/627,104

(22) Filed: Jan. 25, 2007

(65) Prior Publication Data

US 2007/0176087 A1    Aug. 2, 2007

Related U.S. Application Data

(60) Provisional application No. 60/766,601, filed on Jan. 31, 2006.

(51) Int. Cl.
*G01T 1/16* (2006.01)
(52) U.S. Cl. .................................. 250/252.1
(58) Field of Classification Search ............... 250/252.1
See application file for complete search history.

(56) References Cited

U.S. PATENT DOCUMENTS

| 5,543,622 | A | | 8/1996 | Stearns |
| 5,998,793 | A | * | 12/1999 | Shao et al. ................ 250/369 |
| 2005/0109943 | A1 | | 5/2005 | Vaquero et al. |

FOREIGN PATENT DOCUMENTS

EP    0 747 731 A2    12/1996

OTHER PUBLICATIONS

Badawi R.D., Lodge M.A., Marsden P.K.; Algorithms for Calculating Detector Efficiency Normalization Coefficients for True Coincidences in 3D Pet; 1998; Physics in Medicine and Biology; vol. 43; pp. 189-205.*
Divoli A., Erlandsson K., Evans N., Haddock M.C., Flower M.A., Ott R.J.; Normalisation of Emission and Transmission Data Taken with a Large-Area Positron Camera PETRRA; Nov. 2001; Nuclear Science Symposium Conference Record, 2001 IEEE; vol. 3, pp. 1263-1266.*

(Continued)

*Primary Examiner*—David P Porta
*Assistant Examiner*—David S Baker (57) ABSTRACT

A method and apparatus for calibrating a PET scanner is provided. First phantom sinogram data is acquired from a scan of a solid cylinder phantom within a PET scanner imaging FOV; second phantom sinogram data is acquired from a scan of a second solid plane or scanning line phantom within the PET scanner imaging FOV; and a PET scanner detector component scanner efficiency normalization is determined from at least one of the first and second sinogram data. In one aspect a crystal determining efficiency factor is determined as a function of phantom sinogram data without a solid angle correction, and a detector geometry factor is determined as a function of the crystal efficiency factor and phantom sinogram data. In one aspect a smoothed crystal efficiency normalization factor is determined from a noisy crystal efficiency factor through an iterative smoothing technique.

24 Claims, 3 Drawing Sheets

OTHER PUBLICATIONS

Manjeshwar R.M., Ross S.G., Latrou M., Deller T.W., Stearns C.W.; Fully 3D PET Iterative Reconstruction Using Distance-Driven Projectors and Native Scanner Geometry; Nov. 1, 2006; 2006 IEEE Nuclear Science Symposium Conference Record; pp. 2804-2807.*

Badawi et al., A comparison of normalization effects on three whole-body cylindrical 3D PET systems, 2000; Phys. Med. Biol.; vol. 45; pp. 3253-3266.

Casey et al, Quantitation in Positron Emission Computed Tomography: 7. A Technique to Reduce Noise in Accidental Coincidence Measurements and Coincidence Efficiency Calibration, 1986; Journal of Computer Assisted Tomography; vol. 10, No. 5, Raven Press, New York; pp. 845-850.

Casey et al., A Component Based Method for Normalization in Volume PET, Internal Meeting on Fully Three-Dimensional Image Reconstruction in Radiology and Nuclear Medicine, Jul. 1995, pp. 1 & 67-71.

Kinahan et al., Efficency Normalization Techniques for 3D PET Data, IEEE Nuclear Science Symposium and Medical Imaging Conference Record; 1996, vol. 2; pp. 1021-1025.

Meikle et al., Quantitative Techniques in PET, Positron Emission Tomography. 2003, pp. 115-146.

Ollinger, Detector Efficiency and Compton Scatter in Fully 3D PET, IEEE Transactions on Nuclear Science, 1995; vol. 42; pp. 1280-1284.

Wang et al., A New Component Approach Efficiency Normalization for 3D PET, Nov. 2, 2005, pp. 1-5.

* cited by examiner

COMPONENT METHOD AND SYSTEM FOR PET DETECTOR EFFICIENCY NORMALIZATION

CROSS REFERENCE TO RELATED APPLICATIONS

This application claims the benefit of U.S. provisional application Ser. No. 60/766,601 filed Jan. 31, 2006, which is incorporated herein by reference.

BACKGROUND

The present invention relates to the field of positron imaging, and more particularly to positron emission tomography detector efficiency normalization.

Positron emission tomography (PET) is a branch of nuclear medicine in which a positron-emitting radiopharmaceutical such as $^{18}$F-fluorodeoxyglucose (FDG) is introduced into the body of a patient. As the radiopharmaceutical decays, positrons are generated. More specifically, each of a plurality of positrons reacts with an electron in what is known as a positron annihilation event, thereby generating a coincident pair of 511 keV gamma rays which travel in opposite directions along a line of response (LOR).

A PET scanner is used to detect the positron annihilation events and generate an image of at least portions of the patient from a plurality of detected events. The PET scanner comprises a plurality of radiation-sensitive PET detectors arrayed about an examination region through which a patient is conveyed. The PET detectors typically comprise crystals and photomultiplier tubes (PMT's), wherein the detector crystals, referred to as scintillators, convert the energy of a gamma ray into a flash of light that is sensed by the detector PMT. In coincidence mode a gamma ray pair detected within a coincidence time by a pair of PET detectors is recorded by the PET scanner as an annihilation event; in an alternative singles mode technique a gamma ray detected by a single PET detector may be recorded as an annihilation event. During a patient scan hundreds of million of events are typically detected and recorded. The observed events are typically sorted and organized with respect to each of a plurality of projection rays, wherein all events occurring along each projection ray are organized into one bin of a three-dimensional sinogram array, the array typically stored in a computer-readable memory media. The sinogram data is then processed to reconstruct an image of the patient.

Prior to image reconstruction, efficiency normalization techniques are used to correct the sinogram data for non-uniform PET detector responses due to PET scanner geometry, detector crystal non-uniformity, and gain variation in detector PMT's. Efficiency normalization is generally accomplished through direct or component techniques. In direct efficiency normalization, sinogram data acquired from the scan of a special geometry phantom object (such as a cylinder, a rotating plane source, or a rotating line source) is inverted to calibrate a normalization factor directly, after removing known effects of source geometry, attenuation, random and scatter. However, statistical accuracy concerns proscribe direct efficiency normalization for large sinogram sizes.

Component efficiency normalization is generally preferred as better accommodating statistical noise and phantom geometry issues for large sinogram sizes. Component efficiency normalization is categorized by the decomposition of detector normalization into discrete factors (or components) wherein each factor may be calibrated separately. Component efficiency normalization is first approached as two-dimensional and modeled by two categories of factors: detector geometry factors and crystal efficiency factors. Detector geometry factors comprise circular detector geometry and solid angle, gamma ray incident angle and crystal depth of interaction. Crystal efficiency normalization is necessitated by the non-uniform response of detector crystals and their related PMTs. Crystal efficiency factors comprise intrinsic efficiency and deadtime effect. See M. Casey, H. Gadagkar and D. Newport in "A Component Based Method for Normalization in Volume PET", 1995 International Meeting on Fully Three-Dimensional Image Reconstruction in Radiology and Nuclear Medicine.

Two-dimensional component efficiency normalization may be extended to three dimensions (3D) and be made more complex by recognizing and calculating additional component factors. In one technique for block-detector PET scanners a detector block crystal interference pattern factor is added into the detector geometry term, and the normalization is extended from 2D to 3D; See P. Kinahan, D. Townsend, D. Bailey, D. Sashin, F. Jadali and M. Mintun in "Efficiency Normalization Technique for 3D PET Data", *IEEE NSS & MIC Record*, Vol. 2, October 1995. In another technique a time-window alignment factor is added into the model; See R. Badawi, N. Ferreira, S Kohlmyer, M. Dahlbom, P. Marsden and T. Lewellen, "A comparison of normalization effects on three whole-body cylindrical 3D PET systems", *Phys. Med. Biol.*, Vol. 45, 2000.

However, adding additional factors to provide 3D detector efficiency normalization necessarily adds complexity to the normalization model. Moreover, some factors may not be applicable to the efficiency normalization of all PET scanners. For example, some non-block design PET scanners incorporate a pixilated detector module design wherein detector PMT edge rows are shared by neighboring detector modules and controlled by overlapping trigger channels: this type of design enables detector efficiency normalization independent of detector block crystal interference pattern factors.

What is needed is a method and system for 3D component efficiency normalization that provides for a reduced number of component factors and that will provide for efficient 3D PET scanner detector calibration.

SUMMARY

Aspects of the present invention address these matters, and others.

A method and apparatus for calibrating a PET scanner is provided. In one aspect first phantom sinogram data is acquired from a scan of a solid cylinder phantom within a PET scanner imaging FOV; second phantom sinogram data is acquired from a scan of a second solid plane or scanning line phantom within the PET scanner imaging FOV; and a component scanner efficiency normalization of the PET scanner detectors is determined from at least one of the first and second sinogram data.

In another aspect a PET scanner imaging FOV comprises first and second reconstruction imaging FOV's, the first smaller than the second. The first phantom sinogram data is acquired by scanning the solid cylinder phantom in the first reconstruction imaging FOV, and the second phantom sinogram data is acquired by scanning the second phantom source within the second reconstruction imaging FOV. In one aspect the phantoms present transverse cross-sectional scan areas equal to or greater than the reconstruction imaging FOV cross-sectional areas.

In another aspect PET scanner detector component scanner efficiency normalization comprises determining a crystal efficiency factor as a function of phantom sinogram data without a solid angle correction; determining a detector geometry factor as a function of the crystal efficiency factor and phantom sinogram data; and determining a PET scanner detector component scanner efficiency normalization from only the crystal efficiency factor and the detector geometry factor.

In another aspect acquiring phantom sinogram data comprises acquiring first and second data files, deriving one of the crystal efficiency factor and the detector geometry factor for an acquiring one of the first and second reconstruction imaging FOV's from the first data file; and mapping the derived one of the crystal efficiency factor and the detector geometry factor to the second file for the other of the first and second reconstruction imaging FOV's.

In another aspect a crystal efficiency factor is determined by determining a noisy crystal efficiency factor and determining a smoothed crystal efficiency normalization factor from the noisy crystal efficiency factor through an iterative smoothing technique.

One or more articles of manufacture are also provided comprising a computer usable mediums having a computer readable programs that, when executed on a computer, causes the computer to perform the above-described methods and inventions.

Those skilled in the art will appreciate still other aspects of the present invention upon reading and understanding the appended description.

DESCRIPTION

Figure 1:
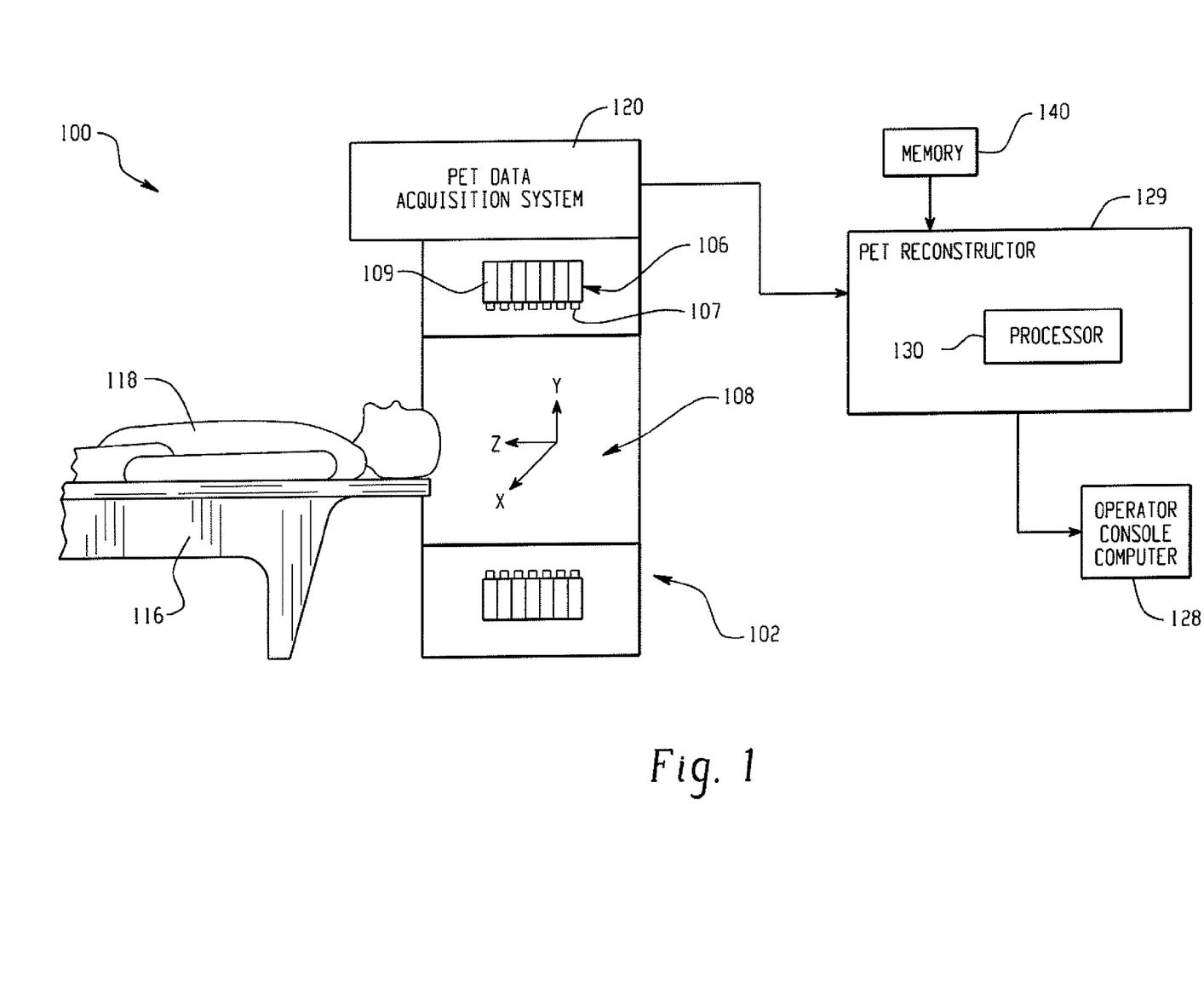
FIG. 1 depicts a PET system.

With reference to FIG. 1, a PET system 100 includes a ring PET gantry portion 102. The PET gantry portion 102 includes one or more axial rings of radiation sensitive PET detectors 106 which surround an examination region 108. The detectors 106 comprise scintillator crystals 107 that convert the energy of each 511 KeV gamma ray characteristic of a positron annihilation event occurring within the PET examination region 108 into a flash of light that is sensed by a photomultiplier tube (PMT) 109.

The PET gantry portion 102 is preferably located in proximity with the examination region 108 and disposed along a common axial or z-axis. An object support 116 supports an object to be imaged 118 such as human patient. The object support 116 is preferably movable relative to an axial axis of the field of view (FOV) of the gantry 102 PET detectors 106, in coordination with operation of the PET system 100 so that the object 118 can be scanned at a plurality of axial locations by the PET gantry portion 102.

A PET data acquisition system 120 provides annihilation event projection data rebinned into one or more sinogram or projection bins which includes information on the LOR for each event, such as a transverse and longitudinal position of the LOR, its transverse and azimuthal angles, and may include time-of-flight (TOF) information. Alternately, the projection data may include a list of annihilation events detected by the detectors 106.

A PET reconstructor 129 includes at least one computer or computer processor 130. The reconstructor 129 performs corrections on the projection data including detector efficiency normalization corrections and uses an iterative technique to generate volumetric image data from the corrected projection data, the image data indicative of the distribution of the radionuclide in the object 118. Computer readable instructions which cause the processor 130 to carry out the projection data correction and/or volumetric image data generation are preferably carried on one or more computer readable media 140 such as computer disks, volatile or non-volatile memory, or the like, and may also be transmitted by way of a suitable communications network such as the internet to storage media 140 accessible to the processor 130. A workstation computer selves as an operator console 128 and includes a human readable output device such as a monitor or display and input devices such as a keyboard and mouse.

Three-dimensional (3D) component scanner efficiency normalization may be modeled from two terms: a 3D crystal efficiency xtalEff(r, phi, slc) term and a two-dimensional (2D) detector geometry term detGeom(r, slc), where indexes r and phi define an LOR's transverse radial and angle coordinates, respectively, and slc defines the LOR's axial detector crystal pair combination, and wherein it is assumed that crystal efficiency applies to true, random and scattered events, and detector geometry only applies to true events. Accordingly, raw coincidence mode LOR sinogram data event data acquired from the scan of a phantom source, after delayed coincidence subtraction, may be modeled as follows $$\text{raw}(r, phi, slc) = \text{xtalEff}(r, phi, slc) * [\text{detGeom}(r, slc) \\ *\text{true}(r, phi, slc) + \text{scatter}(r, phi, slc)] \quad \text{Equation 1}$$

wherein xtalEff(r, phi, slc) is a function of r, phi and slc; detGeom(r, slc) is the 2D detector geometric factor; true(r, phi, slc) is the true emission LOR sinogram with the effect of attenuation; and the scatter(r, phi, slc) is the estimated scatter LOR sinogram. See J. Ollinger, "Detector Efficiency and Compton Scatter in Fully 3D PET", *IEEE Trans. Nucl. Sci*, Vol. 42, 1995; and S. Meikle and R. Badawi, "Quantitative Techniques in PET", *Positron Emission Tomography*, p 115-146, Springer-Verlag 2003.

In one aspect crystal efficiency can be modeled for a given LOR (r, phi, slc) connecting a crystal pair i and j, where Ei and Ej are the crystal efficiency of the individual crystals i and j, by the following:

$$\text{xtalEff}(r, phi, slc) = E_i E_j \quad \text{Equation 2}$$

Figure 2A:
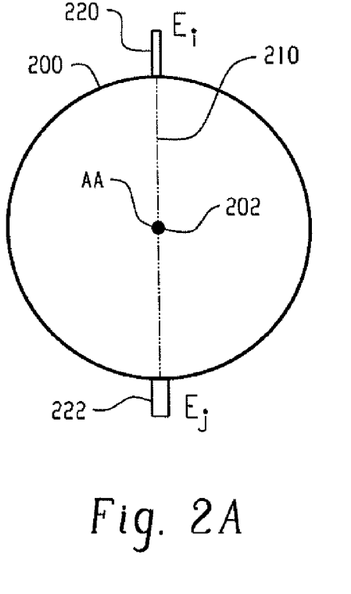
FIG. 2 is a set of graphical illustrations of a PET scanner FOV taken along a transverse direction.
Figure 2B:
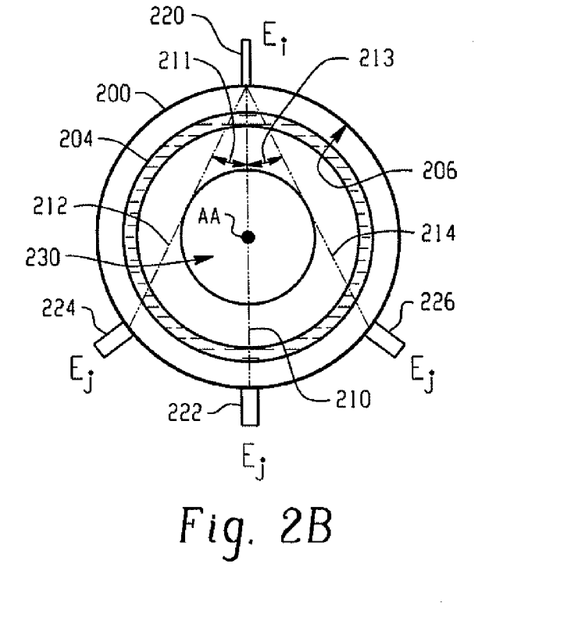

In another aspect the crystal efficiency normalization of a given detector crystal is dependent upon the location of a phantom source within the PET scanner FOV. Referring now to FIG. 2, transverse cross-sectional graphical illustrations of a PET scanner FOV 200 are provided. In FIG. 2a a line source phantom 202 is positioned at the center of the FOV 200 and aligned with the FOV center axial axis AA. FIG. 2b illustrates an image of another line source phantom 204 as other positioned toward the edge 206 of the FOV 200 and rotated around the FOV center axial axis AA.

FIGS. 2a and 2b also illustrate LOR's 210, 212 and 214 defined by sinogram data collected during scans of the line sources 202 and 204. More particularly, LOR 210 is detected by crystal Ei 220 and crystal Ej 222; LOR 212 is detected by crystal Ei 220 and crystal Ej 224; and LOR 214 is detected by crystal Ei 220 and crystal Ej 226. LOR 210 passes through the center axial axis AA and may be described as aligned along a zero incident angle with respect to the detector crystal 220. LOR 212 passes tangent to a reconstruction FOV of interest 230 within the scanner FOV 200 and is aligned along a non-zero incident angle 211 with respect to the detector crystal 220, wherein the FOV of interest 230 corresponds to an anticipated scanned-object cross-sectional area. LOR 214 also passes tangent to the FOV of interest 230 and is aligned along non-zero incident angle 213 with respect to the detector crystal 220.

The respective individual crystal efficiency images of LOR's 210, 212 and 214 at the detector crystal 220 are different due to the divergence of the LOR incident angles 211 and 213 from the zero incident angle of LOR 210, and optionally from each other. More particularly, crystal efficiency results from the respective two line source phantoms 202 and 204 are very different in the transverse direction. The centered line source 202's crystal image will have different structures than that of the edge line source 204: this indicates that when deriving crystal efficiency it is preferred to use a phantom that is resembles the clinical imaging situation, and therefore has activity not only in the center but also at the edge of the FOV. Thus in one aspect in order to calibrate for crystal efficiency for a comprehensive range of possible true event LOR incident angles, including angles associated with the edges of the FOV, it is desirable to use a phantom source with a cross-sectional area size comprehensively including the entire anticipated scanned object cross-sectional area (reconstruction FOV 230); otherwise a solid angle correction factor must be applied.

Figure 3A:
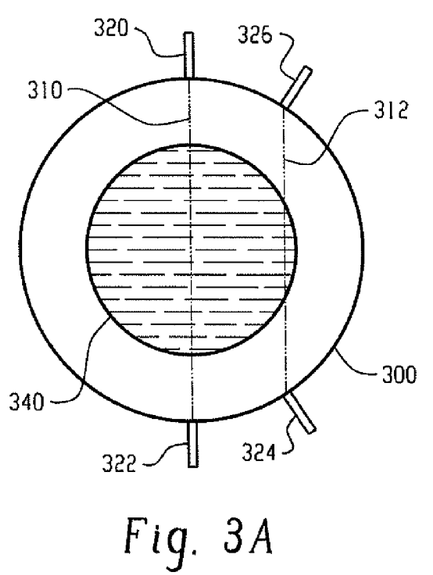
FIG. 3 is another set of graphical illustrations of a PET scanner FOV taken along a transverse direction.
Figure 3B:
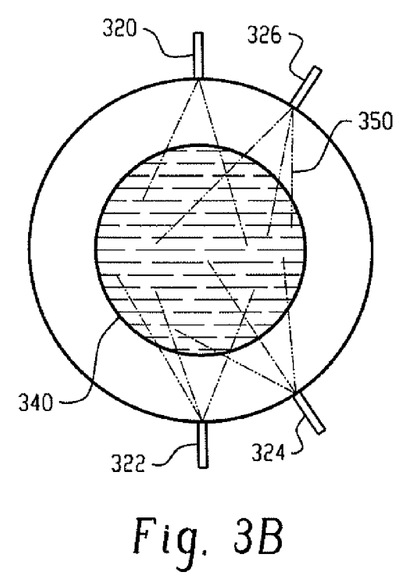

The detector geometric factor detGeom(r, slc) is also dependent upon scanner and source geometry: more specifically, upon photon incident angle, distance of the event from the emission point to the incident crystal and the crystal depth of interaction. Referring now to FIG. 3a, a cylindrical phantom source 340 is illustrated in a transverse cross-sectional view of a PET scanner FOV 300, the source 340 centered within the FOV 300. A true event occurring along LOR 310 is detected by detector crystals 320 and 322 as an annihilation event occurring within the source 340; another "true" event occurring along LOR 312 is detected by detector crystals 324 and 326 as another annihilation event occurring within the source 340. FIG. 3b illustrates a plurality of other non-true random or scattered events occurring along LOR's 350, each detected by one of the detector crystals 320, 322, 324 or 326. In one aspect the efficiency normalization detector geometric factor applies only to true events occurring along LORs and not to random or scattered events. As with crystal efficiency, it is preferable to use a phantom source with a cross-sectional geometry about equivalent to an anticipated scanned object cross-sectional area, otherwise a solid angle correction factor must again be applied.

Accordingly, in one aspect both the crystal efficiency xtalEff(r, phi, slc) and detector geometry detGeom(r, slc) components are determined responsive to the geometric relationship of the PET scanner detector crystals to a source phantom, wherein the geometry of the source phantom and its location within the scanner FOV may be chosen to obviate the need for a solid angle correction component to the component detector efficiency normalization.

For example, a crystal efficiency component may be derived from a cylinder phantom without the requirement for detector solid angle correction. Restating Equation 1 above for a cylinder phantom, a cylinder efficiency factor for raw LOR sinogram data after on-line random correction may be modeled by the following:

$$cylRaw(r, phi, slc) = xtalEff(r, phi, slc) * [det\,Geom(r, slc) * cylTrue(r, phi, slc) + cylScatter(r, phi, slc)] \quad \text{Equation 3:}$$

In one aspect if the cylinder phantom is parallel to the FOV axial axis and centered in the transverse plane, neither cylTrue(r, phi, slc) or cylScatter(r, phi, slc) depend on phi except for some sampling patterns. Accordingly, we may average Equation 3 on phi and use a crystal efficiency assumption defined by the following:

$$\sum_{phi} xtalEff(r, phi, slc) \cong a(slc) * \sum_{phi} sampPattern(r, phi) \quad \text{Equation 4}$$

wherein sampPattern(r,phi) is an LOR sinogram sampling pattern which indicates the number of degenerate LORs that falls in each sinogram bin and is independent of slc; and a(slc) is the average axial variation of the crystal efficiency and can be estimated separately by averaging the cylinder LOR sinogram on all (r, phi).

In one aspect a two-dimensional cylinder efficiency factor for measured raw LOR sinogram data cylRaw2d(r,slc) may be defined by the following:

$$cylRaw2d(r, slc) = \\ a(slc) * [detGeom(r, slc) * cylTrue(r, slc) + cylScatter(r, slc)] \quad \text{Equation 5}$$

In another aspect Equation 5 may also restated as the following:

$$cylRaw2d(r, slc) = \frac{\sum_{phi} cylRaw(r, phi, slc)}{\sum_{phi} sampPattern(r, phi)} \quad \text{Equation 6}$$

In one aspect, in Equation 5 the two-dimensional crystal efficiency factor cylRaw2d(r,slc) may be separated out, enabling the derivation of detector geometry factor detGeom(r,slc) by the following:

$$detGeom(r, slc) = \frac{cylRaw2d(r, slc)/a(slc) - cylScatter(r, slc)}{cylTrue(r, slc)} \quad \text{Equation 7}$$

In another aspect, inserting Equation 7 into Equation 3 may produce the following equation for crystal efficiency estimation, including photon noise:

$$NoisyXtalEff(r, phi, slc) = \frac{a(slc)cylRaw(r, phi, slc)}{cylRaw2d(r, slc)} \quad \text{Equation 8}$$

In order to improve the noise statistics of a crystal efficiency estimation it is known to perform a Casey-Hoffman average. See M. Casey and E. Hoffman, "Quantitation in Positron Emission Computed Tomography: 7. A Technique to Reduce Noise in Accidental Coincidence Measurements and Coincidence Efficiency Calibration", *Journal of Computer Assisted Tomography*, 10(5), 1986 Raven Press, New York. In one aspect an iterative smoothing technique is instead provided that results in a more accurate noise-free estimate of crystal efficiency component. More particularly, for a noisy crystal efficiency LOR sinogram $R_{ij}$ connecting crystal i and j, where i≠j and i<j, an individual crystal's efficiency may be modeled as $E_i$, where i=0~N−1, where N is the number of crystals in the scanner. If there is no noise in $R_{ij}$, the LOR crystal efficiency xtalEff(r, phi, slc) may be determined as the product of $E_i*E_j$. Given N discrete crystals, and L measured LORs, as long as N≤L, we can solve for $E_i$ by minimizing the following objective function:

$$\Phi(E) = \sum_{i,j=0}^{L-1} (E_i E_j - R_{ij})^2 \quad i < j \qquad \text{Equation 9}$$

The Equation 9 objective function is not strictly globally concave with respect to E; however, it is concave with respect to each $E_i$ if other crystals' efficiencies are fixed. Thus the algorithm converges if using sequential update with respect to E. Moreover, the following may be specified:

$$\frac{\partial \Phi}{\partial E_i} = 0 \qquad \text{Equation 10}$$

Figure 4:
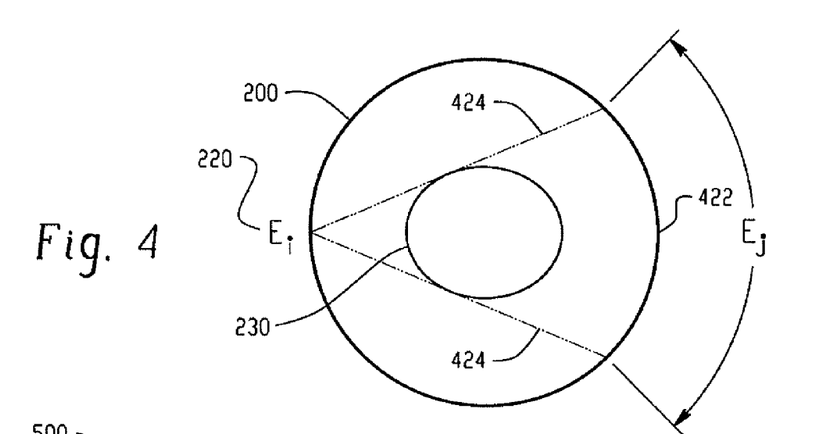
FIG. 4 is another set of graphical illustrations of a PET scanner FOV taken along a transverse direction.

Referring now to FIG. 4, $E_i$ and $E_j$ may be defined as true coincident pair LOR detector crystal combinations relative to the reconstruction FOV of interest 230 within the scanner FOV 200, wherein and $E_j$ 220 is depicted as occurring along a range 422 of possible detector crystals that may be connected to $E_i$ 220 by rays 424 passing through the reconstruction FOV of interest 230. This definition enables the derivation of the following function:

$$\hat{E}_i^{k+1} = \frac{\sum_{\substack{j \\ j \neq i}} \hat{E}_j^k R_{ij}}{\sum_{\substack{j \\ j \neq i}} (\hat{E}_j^k)^2} \qquad \text{Equation 11}$$

In one aspect Equation 11 is iterated until convergence (and where the objective function Equation 9 is minimized), wherein only the data from within the phantom region is used. The smoothed crystal efficiency normalization factor smoothXtalEff(r, phi, slc) is then the product of ($E_i*E_j$). Moreover, given a uniform initial estimate the first iteration of Equation 11 is approximately equivalent to the Casey-Hoffman average described above; therefore, it is readily apparent that using the iterative method defined by Equation 11 will provide progressively more accurate noise-free crystal efficiency normalization with each iteration, thereby providing a better result than one obtainable through a Casey-Hoffman average technique.

In another aspect, the assumption defined by Equation 4 above may be confirmed by re-estimating a resultant noisy crystal efficiency normalization factor according to the following:

$$noisyXtalEff^{k+1}(r, phi, slc) = \qquad \text{Equation 12}$$
$$smoothXtalEff2d^k(r, slc) \frac{cylRaw(r, phi, slc)}{clyRaw2d(r, slc)}$$

$$smoothXtalEff2d^k(r, slc) = \frac{\sum_{phi} smoothXtalEff^k(r, phi, slc)}{\sum_{phi} sampPattern(r, phi)} \qquad \text{Equation 13}$$

Note that in the right hand side of Equation 12, the smoothed crystal efficiency normalization is the result of the previous iterative smoothing estimate. The re-estimated noisy crystal efficiency using Equation 12 can be re-smoothed using Equation 11. This process can be repeated till the smoothed crystal efficiency normalization does not change much from the previous estimation.

In another aspect a detector geometric component may be derived without the requirement for detector solid angle correction factor. For example, if a cylinder phantom is large enough to cover an imaging FOV, then the detector geometric factor can be estimated using the following:

$$detGeom(r, slc) = \frac{\sum_{phi}[cylRaw(r, phi, slc)/ smoothXtalEff(r, phi, slc) - cylScatter(r, phi, slc)]}{\sum_{phi} cylTrue(r, phi, slc)}. \qquad \text{Equation 14}$$

Figure 5:
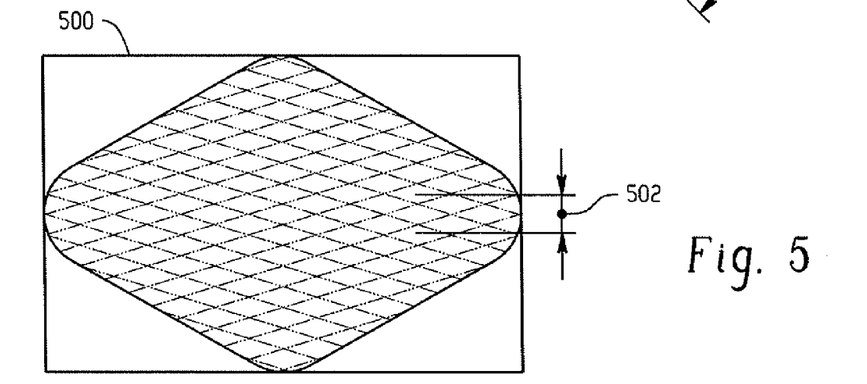
FIG. 5 provides a transverse view of an LOR sinogram from a plane phantom source.

However, in the case of scanners with large FOV's, such as one scanner configured to scan human patients, it is generally not practical to use a cylinder phantom large enough to encompass the entire scanner imaging FOV to perform a normalization calibration. Accordingly, in aspect a plane source large enough to cover the imaging transverse and axial FOVs may instead provide a favorable phantom geometry due to a low level of scatter. Alternatively, a scanning line source moved along a linear direction normal to the linear orientation of the line source (thereby providing a planar source profile over time to the scanner) large enough to cover the imaging transverse and axial FOV's may also provide a favorable phantom geometry with a low level of scatter FIG. 5 provides a view of a LOR sinogram (r, phi) 500 from a horizontally placed plane phantom positioned horizontally and centered in a PET scanner FOV relative to the axial axis of the FOV. A middle region of interest FOV phiROI 502 covers the whole transverse FOV, and LORs at the sinogram 500 phi's are perpendicular to the plane source in the transverse domain. LORs that are perpendicular transversely (phi<90°±13°) to the plane source have very low incidences of scatter: for example, scattered events may be expected to result in only about 0.4% of the total coincidence events reported. LORs representing true events are constant in r and will vary slightly (only ±1~2% relative to the mean) in slc. Thus we can ignore the scatter and true's variation at these phi's, and use the plane source's LOR sinogram (after online random correction) directly to estimate the detector geometric factor from the following:

$$planeDetGeom(r, slc) = \frac{\sum_{phi \in phiROI} planeRaw(r, phi, slc) / smoothXtalEff(r, phi, slc)}{\sum_{phi \in phiROI} sampPattern(r, phi)}$$

Equation 15

Figure 6A:
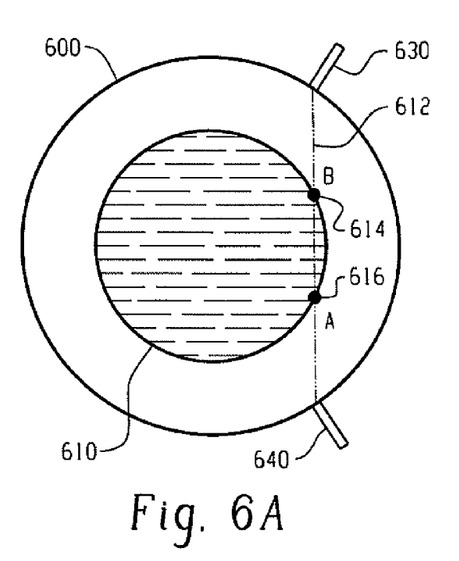
FIG. 6 is another set of graphical illustrations of a PET scanner FOV taken along a transverse direction.
Figure 6B:
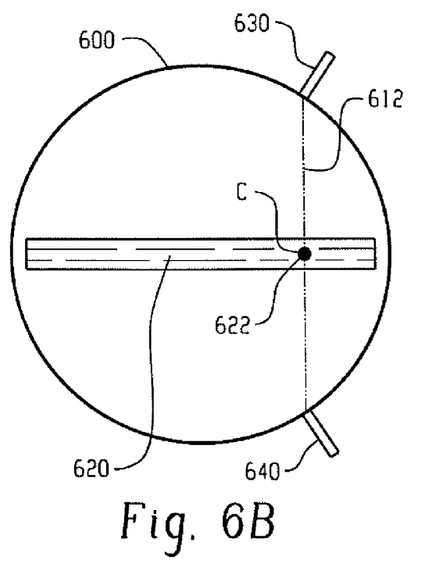

However, the plane source phantom geometry is different from a typical patient or object geometry: more particularly, detected true LOR's solid angles are different. For example, FIG. 6 provides an illustration of the differences in solid angle for cylindrical and planar phantoms. FIG. 6a provides a traverse view of a scanner FOV 600 with a cylindrical phantom 610 centered therein. FIG. 6b provides a traverse view of the same scanner FOV 600 with a planar phantom 620 centered therein. The solid angle of a LOR 612 passing through the cylinder phantom 610 and detected by detectors 630 and 640 is integrated from point A 616 to point B 614, while the solid angle of the same LOR 612 passing through the plane source 620 is only integrated from point C 622. Thus a detector geometry factor derived from the plane source 620 differs in the transverse radial direction with respect to one derived from the cylinder source 610; in the axial direction, they are very similar to each other. Accordingly, a detector geometry factor derived from a plane source needs to be corrected for this radial solid angle difference by the following, wherein the plane source's angular position does not affect the detector geometry factor:

$$det\,Geom(r, slc) = planeDetGeom(r, slc) * planeRadCorr(r)$$

Equation 16

In another aspect, crystal efficiency normalization has more impact on reconstruction as compared with the detector geometry correction. Accordingly, in order to improve detector normalization correction efficiencies it is preferred that crystal efficiency correction is applied before the scatter correction, and that detector geometry correction be applied after the scatter correction.

Small PET scanner example. Thus in one aspect, for a PET scanner with a small imaging FOV (such as one configured to scan small animals), a cylinder phantom source that covers the whole imaging FOV may be used to calibrate both crystal efficiency and detector geometry factors. In one example a uniform cylinder phantom having a 20 cm diameter and a 30 cm length is filled with 2mCi F-18 and placed in the center of a small imaging FOV with a 128 mm transverse diameter, wherein the crystal efficiency may be calibrated using the following method steps:

1. Acquire cylinder LOR sinogram data. The activity in the cylinder phantom should close to clinical applications. The cylinder should be parallel to the scanner axial axis, centered in the transverse FOV and covering the scanner axial FOV. Each sinogram bin within phantom region should preferably have at least 10 counts.
2. Compute the initial noisy crystal efficiency normalization using Equation 8 described above.
3. Smooth the noisy crystal efficiency using the iterative Equation 11 and the crystal efficiency model Equation 2 described above.
4. Lastly, re-estimate the noisy crystal efficiency normalization factor according to Equation 12 described above, and repeat steps 3 and 4 until convergence.

After the crystal efficiency normalization is complete, then cylinder's true and scattered LOR sinogram is computed and the detector geometry factor may be estimated using Equation 14 described above.

Large PET scanner example. However, as discussed above for a PET scanner with a larger imaging FOV (such as one configured to scan human patients), using a cylinder phantom large enough to cover the whole imaging FOV may not be desirable or practical. Accordingly, in another aspect two phantoms may be used to perform crystal normalization calibration. In a first step a small cylinder phantom is scanned in a first scan within a small FOV and used to derive a crystal efficiency factor through the four-step procedure described above. The detector geometric factor is then derived in a second step from a separate scan of a plane phantom (or a moving scanning line source which presents a planar source profile over time to the scanner), through application of detector geometric factor Equation 15. As a plane phantom source is used in this second step, the detector geometric factor requires correction for radial solid angle difference through application of Equation 16. In one example a plane phantom having a 635 mm transverse dimension, a 475 mm axial dimension and a 42 mm thickness is filled with 3mCi F-18 and placed horizontally in the center of a PET scanner having a 576 mm transverse diameter FOV.

In another aspect two data files may be generated from any one phantom scan acquisition. Thus one scan acquisition of a cylindrical phantom covering a first small imaging FOV may generate two files for crystal efficiency normalization: a first file to derive a smoothed crystal efficiency factor for a first small imaging FOV according to the techniques described above, and a second file for mapping the smoothed crystal efficiency factor to a larger second imaging FOV. Similarly, one scan acquisition of a plane or scanning line phantom covering the second larger-sized imaging FOV may generate two files for detector geometry normalization: a first file to derive the detector geometry factor for the larger-sized imaging FOV according to the techniques described above, and a second file for mapping the detector geometry factor to the smaller imaging FOV.

The above examples have been described with respect to coincidence mode techniques for the detection of PET annihilation events. In another aspect the techniques described above may be readily adapted for use with singles mode detection of annihilation events.

An embodiment of the invention(s) described above is tangibly embodied in a computer program stored in suitable memory storage device 140 and made available to the system 100 and reconstructor 129. Exemplary machine-readable memory storage mediums include, but are not limited to, fixed hard drives, optical discs, magnetic tapes, semiconductor memories, such as read-only memories (ROMs), programmable (PROMs), etc. The memory 140 containing the computer readable code is utilized by executing the code directly from the memory 140, or by copying the code from one memory storage device to another memory storage device, or by transmitting the code on a network for remote execution. The memory 140 may comprise one or more of a fixed and/or removable data storage device such as a floppy disk or a CD-ROM, or it may consist of some other type of data storage or data communications device. The computer program may be loaded into the memory of a computer to configure a processor for execution of the techniques described above. The computer program comprises instructions which, when read and executed by a processor causes the processor to perform the steps necessary to execute the steps or elements of the present invention.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A method for calibrating a PET scanner, comprising the steps of:
    acquiring first phantom sinogram data from a scan of a first phantom within a PET scanner imaging FOV;
    acquiring second phantom sinogram data from a scan of a second phantom within the PET scanner imaging FOV; and
    determining a PET scanner detector component scanner efficiency normalization according to the steps of:
    determining a crystal efficiency factor as a function of the first and second phantom sinogram data, wherein the crystal efficiency factor is derived without a solid angle correction;
    determining a detector geometry factor as a function of the crystal efficiency factor and the first and second phantom sinogram data; and
    determining the PET scanner detector component scanner efficiency normalization from the crystal efficiency factor and the detector geometry factor.

2. The method of claim 1, wherein the step of determining the PET scanner detector component scanner efficiency normalization comprises the steps of:
    modeling a noisy crystal efficiency factor $E_i$ as a function of at least one of the first and second sinogram data by the following Equation C:

$$\hat{E}_i^{k+1} = \frac{\sum_{\substack{j \\ j \neq i}} \hat{E}_j^k R_{ij}}{\sum_{\substack{j \\ j \neq i}} \left(\hat{E}_j^k\right)^2}$$

where $R_{ij}$ is a noisy crystal efficiency factor connecting coincident pair detector crystals i and j, $R_{ij}$ true relative to one of the first and second reconstruction imaging FOV's, i≠j and i<j;
    determining a smoothed crystal efficiency factor estimate smoothXtalEff as the product of $E_i * E_j$;
    repeating the modeling and determining steps until the estimate smoothXtalEff converges within a specified difference from a prior smoothXtalEff estimate;
    determining the detector geometry factor as a function of smoothXtalEff and at least one of the first and second sinogram data; and
    determining the PET scanner detector component scanner efficiency normalization from only smoothXtalEff and the detector geometry factor.

3. The method of claim 1, wherein one of the steps of acquiring first phantom sinogram data and acquiring second phantom sinogram data comprises acquiring first and second data files, further comprising the steps of:
    deriving the crystal efficiency factor or the detector geometry factor for acquiring one of the first and second reconstruction imaging FOV's from the first data file; and
    mapping the derived crystal efficiency factor or the derived detector geometry factor to the second file for an other of the first and second reconstruction imaging FOV's.

4. The method of claim 1 wherein the PET scanner imaging FOV comprises first and second reconstruction imaging FOV's, the first reconstruction imaging FOV having a transverse cross-sectional area smaller than a second reconstruction imaging FOV transverse cross-sectional area;
    wherein the step of acquiring the first phantom sinogram data comprises scanning the first phantom within the first reconstruction imaging FOV; and
    wherein the step of acquiring the second phantom sinogram data comprises scanning the second phantom within the second reconstruction imaging FOV.

5. The method of claim 4, wherein the step of scanning the first phantom within the first reconstruction imaging FOV comprises the step of the first phantom presenting a transverse cross-sectional scan area equal to or greater than the first reconstruction imaging FOV cross-sectional area; and
    wherein the step of scanning the second phantom source within the second reconstruction imaging FOV comprises the step of the second phantom presenting a linear transverse cross-sectional scan area equal to or greater than a transverse width of the second reconstruction imaging FOV cross-sectional area.

6. The method of claim 1 wherein the first phantom is a solid cylinder phantom; and
    the second phantom is selected from the group consisting of a solid plane phantom and a scanning line phantom.

7. The method of claim 6, wherein one of the steps of acquiring first phantom sinogram data and acquiring second phantom sinogram data comprises acquiring first and second data files, further comprising the steps of:
    deriving one of the crystal efficiency factor and the detector geometry factor for acquiring one of the first and second reconstruction imaging FOV's from the first data file; and
    mapping the derived one of the crystal efficiency factor and the detector geometry factor to the second file for an other of the first and second reconstruction imaging FOV's.

8. The method of claim 6 wherein the step of determining the crystal efficiency factor comprises the steps of:
    determining a noisy crystal efficiency factor; and
    determining a smoothed crystal efficiency normalization factor from the noisy crystal efficiency factor through an iterative smoothing technique.

9. The method of claim 8, wherein the iterative smoothing technique comprises the steps of:
    modeling an individual detector crystal efficiency factor $E_i$ by the following Equation C:

$$\hat{E}_i^{k+1} = \frac{\sum_{\substack{j \\ j \neq i}} \hat{E}_j^k R_{ij}}{\sum_{\substack{j \\ j \neq i}} \left(\hat{E}_j^k\right)^2}$$

where $R_{ij}$ is a noisy crystal efficiency connecting coincident pair detector crystals i and j, $R_{ij}$ true relative to one of the first and second reconstruction imaging FOV's, i≠j and i<j;
    determining a smoothed crystal efficiency factor estimate smoothXtalEff as the product of $E_i * E_j$; and
    repeating the modeling and determining steps until the estimate smoothXtalEff converges within a specified difference from a prior smoothXtalEff estimate.

10. A method for calibrating a PET scanner, comprising the steps of:

acquiring first phantom sinogram data from a scan of a first phantom within a first PET scanner reconstruction imaging FOV;

acquiring second phantom sinogram data from a scan of a second phantom within a second PET scanner reconstruction imaging FOV; the second reconstruction imaging FOV having a transverse cross-sectional area larger than a first reconstruction imaging FOV transverse cross-sectional area;

determining a crystal efficiency factor as a function of at least one of the first and second sinogram data, wherein the crystal efficiency factor is derived without a solid angle correction;

determining a detector geometry factor as a function of the crystal efficiency factor and at least one of the first and second sinogram data; and determining a PET scanner detector component scanner efficiency normalization from only the crystal efficiency factor and the detector geometry factor.

11. A method for determining a PET scanner crystal efficiency factor, comprising the steps of:

acquiring phantom sinogram data from a scan of a phantom within a PET scanner imaging FOV;

modeling a noisy crystal efficiency factor from the sinogram data;

determining a smoothed crystal efficiency factor estimate from the noisy crystal efficiency factor;

repeating the modeling and determining steps until the smoothed crystal efficiency factor estimate converges within a specified difference from a prior smoothed crystal efficiency factor estimate.

12. An apparatus for calibrating a PET scanner, comprising:

a processor configured to acquire first phantom sinogram data from a scan of a first phantom within a PET scanner imaging FOV;

the processor further configured to acquire second phantom sinogram data from a scan of a second phantom within the PET scanner imaging FOV; and the processor further configured to determine a PET scanner detector component scanner efficiency normalization according to the steps of:

determining a crystal efficiency factor as a function of the first and second phantom sinogram data;

determining a detector geometry factor as a function of the crystal geometry factor and the first and second phantom sinogram data; and determining the PET scanner detector component scanner efficiency normalization from only the crystal efficiency factor and the detector geometry factor.

13. The apparatus of claim 12, wherein the processor is configured to acquire the first phantom sinogram data or the second phantom sinogram data by acquiring first and second data files;

the processor further configured to derive the crystal efficiency factor or the detector geometry factor for acquiring one of the first and second reconstruction imaging FOV's from the first data file; and map the derived crystal efficiency factor or the derived detector geometry factor to the second file for an other of the first and second reconstruction imaging FOV's.

14. The apparatus of claim 12 wherein the PET scanner imaging FOV comprises first and second reconstruction imaging FOV's, the first reconstruction imaging FOV having a transverse cross-sectional area smaller than a second reconstruction imaging FOV transverse cross-sectional area;

wherein the processor is configured to acquire the first phantom sinogram data by scanning the first phantom within the first reconstruction imaging FOV and to acquire the second phantom sinogram data by scanning the second phantom within the second reconstruction imaging FOV.

15. The apparatus of claim 12 wherein the first phantom is a solid cylinder phantom; and the second phantom is selected from the group consisting of a solid plane phantom and a scanning line phantom.

16. The apparatus of claim 15, wherein the processor is configured to acquire the first phantom sinogram data or the second phantom sinogram data by acquiring first and second data files;

the processor further configured to derive one of the crystal efficiency factor and the detector geometry factor for acquiring one of the first and second reconstruction imaging FOV's from the first data file; and map the derived one of the crystal efficiency factor and the detector geometry factor to the second file for an other of the first and second reconstruction imaging FOV's.

17. The apparatus of claim 15 wherein the processor is configured to determine the crystal efficiency by:

determining a noisy crystal efficiency factor; and determining a smoothed crystal efficiency normalization factor from the noisy crystal efficiency factor through an iterative smoothing technique.

18. The apparatus of claim 17, wherein the iterative smoothing technique comprises the steps of:

modeling an individual detector crystal efficiency factor $E_i$ by the following Equation C:

$$\hat{E}_i^{k+1} = \frac{\sum_{\substack{j \\ j \neq i}} \hat{E}_j^k R_{ij}}{\sum_{\substack{j \\ j \neq i}} (\hat{E}_j^k)^2},$$

where $R_{ij}$ is a noisy crystal efficiency connecting coincident pair detector crystals i and j, $R_{ij}$ true relative to one of the first and second reconstruction imaging FOV's, i≠j and i<j;

determining a smoothed crystal efficiency factor estimate smoothXtalEff as the product of $E_i * E_j$; and repeating the modeling and determining steps until the estimate smoothXtalEff converges within a specified difference from a prior smoothXtalEff estimate.

19. An article of manufacture comprising a non-transitory computer usable medium having a non-transitory computer readable program embodied in said medium, wherein the non-transitory computer readable program, when executed on a computer, causes the computer to calibrate a PET scanner by:

acquiring first phantom sinogram data from a scan of a solid cylinder phantom within a PET scanner imaging FOV;

acquiring second phantom sinogram data from a scan of a second phantom within the PET scanner imaging FOV, the second phantom selected from the group comprising a solid plane phantom and a scanning line phantom; and determining a PET scanner detector component scanner efficiency normalization according to the steps of:

determining a crystal efficiency factor as a function of the first and second phantom sonogram data;

determining a detector geometry factor as a function of the crystal geometry factor and the first and second phantom sonogram data; and determining the PET scanner detector component scanner efficiency normalization from only the crystal efficiency factor and the detector geometry factor.

20. The article of manufacture of claim 19, wherein the computer readable program, when executed on the computer, causes the computer to:

acquire the first phantom sinogram data or the second phantom sinogram data by acquiring first and second data files;

derive the crystal efficiency factor or the detector geometry factor for acquiring one of the first and second reconstruction imaging FOV's from the first data file; and map the derived crystal efficiency factor or the derived detector geometry factor to the second file for an other of the first and second reconstruction imaging FOV's.

21. The article of manufacture of claim 19, wherein the PET scanner imaging FOV comprises first and second reconstruction imaging FOV's, the first reconstruction imaging FOV having a transverse cross-sectional area smaller than a second reconstruction imaging FOV transverse cross-sectional area, and wherein the computer readable program, when executed on the computer, causes the computer to:

acquire the first phantom sinogram data by scanning the solid cylinder phantom within the first reconstruction imaging FOV; and acquire the second phantom sinogram data by scanning the second phantom within the second reconstruction imaging FOV.

22. The article of manufacture of claim 19, wherein the computer readable program, when executed on the computer, causes the computer to:

acquire the first phantom sinogram data or the second phantom sinogram data by acquiring first and second data files;

derive one of the crystal efficiency factor and the detector geometry factor for acquiring one of the first and second reconstruction imaging FOV's from the first data file; and map the derived one of the crystal efficiency factor and the detector geometry factor to the second file for the other of the first and second reconstruction imaging FOV's.

23. The article of manufacture of claim 19 wherein the computer readable program, when executed on the computer, causes the computer to determine the crystal efficiency by:

determining a noisy crystal efficiency factor; and determining a smoothed crystal efficiency normalization factor from the noisy crystal efficiency factor through an iterative smoothing technique.

24. The article of manufacture of claim 23, wherein the iterative smoothing technique comprises the steps of:

modeling an individual detector crystal efficiency factor Ei by the following Equation C:

$$\hat{E}_i^{k+1} = \frac{\sum_{\substack{j \\ j \neq i}} \hat{E}_j^k R_{ij}}{\sum_{\substack{j \\ j \neq i}} \left(\hat{E}_j^k\right)^2}$$

where $R_{ij}$ is a noisy crystal efficiency connecting coincident pair detector crystals i and j, $R_{ij}$ true relative to one of the first and second reconstruction imaging FOV's, i≠j and i<j;

determining a smoothed crystal efficiency factor estimate smoothXtalEff as the product of $E_i * E_j$; and repeating the modeling and determining steps until the estimate smoothXtalEff converges within a specified difference from a prior smoothXtalEff estimate.

* * * * *